United States Patent [19]
Beckwith

[11] 3,721,894
[45] March 20, 1973

[54] REGULATOR CONTROL
[76] Inventor: Robert W. Beckwith, 1002 Greenfield Lane, Mount Prospect, Ill. 60056
[22] Filed: May 15, 1972
[21] Appl. No.: 253,425

[52] U.S. Cl. .................. 323/20, 307/297, 328/137, 323/24, 323/34, 323/43.5 S
[51] Int. Cl. ........................... G05f 5/00, H01f 29/00
[58] Field of Search ........... 323/6, 20, 22 SC, 24, 34, 323/43.5 S; 328/133, 137; 307/297; 317/99, 101 CB, 101 A, 101 B

[56] References Cited

UNITED STATES PATENTS 3,651,393  3/1972  Pohm .................................. 323/20
3,678,370  7/1972  Gately ................................ 323/20

FOREIGN PATENTS OR APPLICATIONS

1,801,240  4/1970  Germany .......................... 323/20
1,904,258  8/1970  Germany .......................... 323/20

Primary Examiner—Gerald Goldberg
Attorney—Anthony S. Zummer

[57]  ABSTRACT

A circuit is disclosed for providing control to a voltage regulator device for monitoring and regulating the voltage of an electrical system. The line voltage, a voltage in phase with the input current and a voltage phase shifted relative to the input current are summed and the resultant D.C. voltage is compared with a voltage bandwidth circuit.

35 Claims, 4 Drawing Figures

REGULATOR CONTROL

BACKGROUND OF THE INVENTION

In an attempt to provide a constant voltage to users, the electric utilities employ tap-changing transformers or regulators which automatically adjust to maintain a constant voltage. More specifically, the electrical transmission system is monitored and any changes from a given bandwidth are noted, and provision made for changing the tap of the associated transformers to regulate or bring the voltage within the selected bandwidth.

In such tap-changer controls, provision is normally made to change tap selectors switches to contact a point of desired potential. For example, should the voltage in the system go below a selected potential, provision is made to energize a motor to drive the tap selector switches to make contact with a point of higher potential, and conversely, if the voltage goes above a selected potential, the motor is energized to drive the tap selector switches to make contact with a point of lower potential.

It is a principal object of the present invention to provide improved circuitry for transformer or regulator control for an electrical transmission system.

It is another object of the present invention to provide a control circuit which is sensitive to voltage variations and which provides a quick acting response to correct any such variations.

The foregoing and other features and advantages of the invention will be apparent from the following more particular description of a preferred embodiment, as illustrated in the accompanying drawings wherein:

DESCRIPTION OF THE INVENTION

Figure 1:
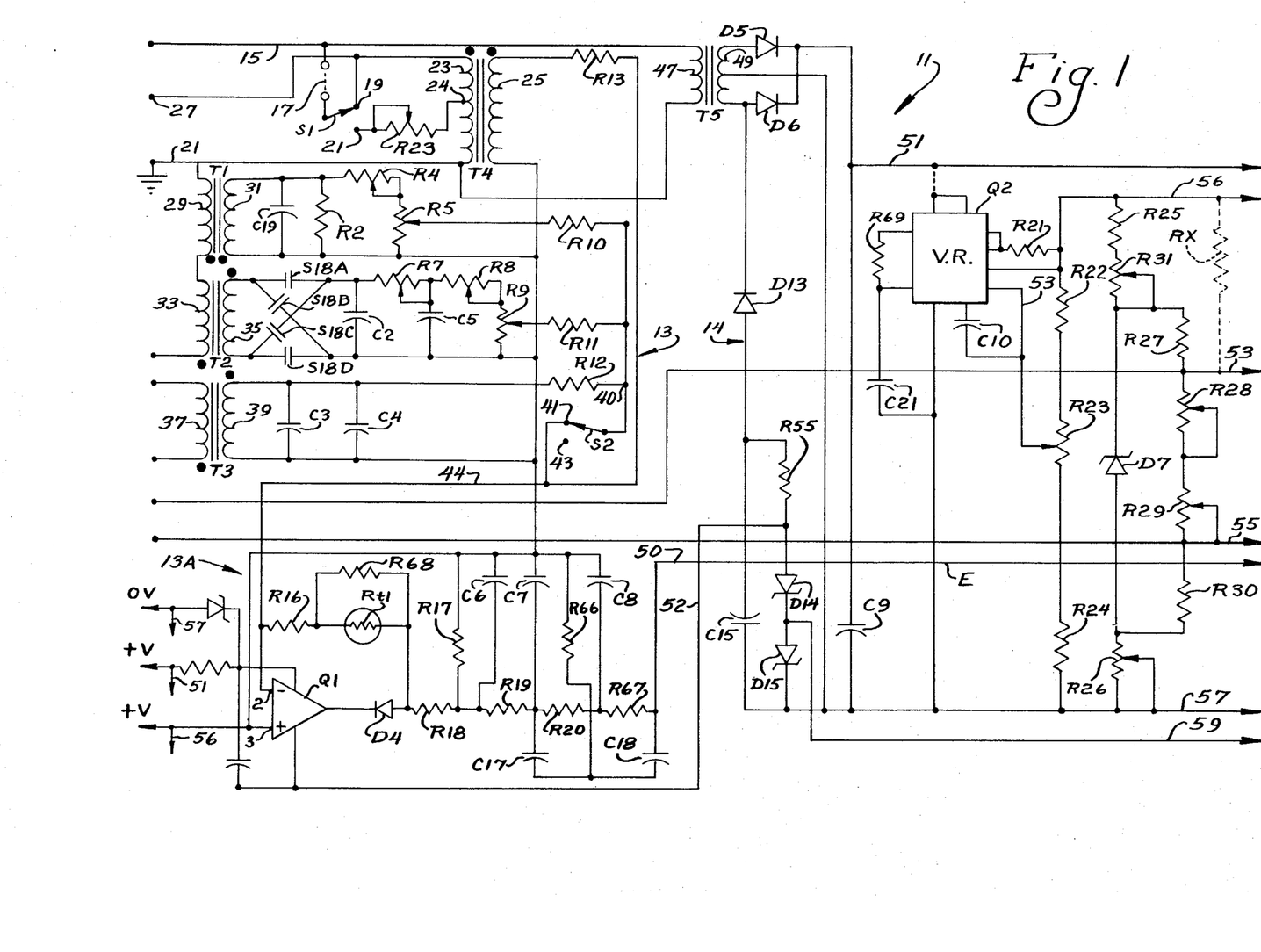
FIGS. 1 and 2 show a schematic diagram of the inventive regulator control with FIGS. 1 and 2 positioned lengthwise relative to each other and with FIG. 2 positioned to the right of FIG. 1.

FIG. 1 shows a part of the circuit 11 of the regulator control 10 of the invention with the left hand portion of FIG. 1 comprising a line drop compensator 13 which includes adjustable resistors and reactances in the circuit.

The potential to be measured is coupled to circuit 11 through lead 15 and a suitable jumper 17 to a switch S1 which is shown in its operate position 19. With switch S1 in position, as shown, the line voltage is coupled through the primary winding 23 of a transformer T4 through lead 21 to ground reference. The transformer T4 scales the voltage down by a ratio of 10 to 1 so that 120 vac on the primary winding 23 is scaled down to 12 vac on the secondary winding 25.

Switch S1, when actuated to its test terminal 21, couples a voltage through a variable resistor R23 to a 90% tap 24 on primary winding 23. By use of tap 24, a relatively raised or lowered voltage is developed across the primary winding 23.

A suitable voltmeter, not shown, is connected to the upper terminal 27 of primary winding 23 for test purposes. Switch S1 is thus part of a test circuit for connecting the input potential to a tap on the potential transformer T4, which together with the variable series test resistor R23, provides an increase or decrease in the effective input voltage to thereby permit the normal input potential to be used to check either the upper or lower band limits. A relatively larger diameter wire is used on that portion of the primary winding 23 of transformer T4 between the normal input tap connected to lead 15 and the test input tap 24, so as to form an autotransformer of the transformer primary. This permits a voltmeter of any suitable impedance to measure the full effective transformer input voltage in the test condition with negligable error due to any loading effect of the voltmeter.

Line drop compensator 13 further includes a current transformer T1 having a primary winding 29 and a secondary winding 31. The low inductance of transformer T1 enables the output voltage from the secondary winding 31 to be practically in phase with the input current. A capacitor C19 and a resistor R2 are connected in parallel with secondary winding 31 with the capacitor cancelling the effects of the residual inductance of the transformer. A series connected trimmer resistor R4 adjusts the available full scale compensation voltage and a control resistor R5 adjusts the used portion of the compensation voltage. The windings 29 and 31 are connected to have the same polarity as conventionally indicated by the dots in FIG. 1.

A second current transformer T2 has its primary winding 33 connected in series with the primary winding 29 of transformer T1. In transformer T2, the polarity of the secondary winding 35 is reversed relative to the polarity of its primary winding 33. The secondary winding 35 of transformer T2 is connected to a polarity reversing switch having four different contacts S18A, S18B, S18C, S18D and a capacitor C2 connected in parallel with secondary winding 35. Capacitor C2, a variable resistor R7 and a capacitor C5 are connected as a $\pi$ network to provide a 90° phase shift.

As mentioned, the RC network connected to the reversed secondary winding of transformer T2 provides a voltage proportional to the input current which is precisely 90° leading the input current. Adjustable resistor R7 adjusts the phase angle and adjustable resistor R8 adjusts the magnitude of the leading voltage to desired values to compensate for component tolerances. The RC network provides a linear capacitive burden and the secondary winding 35 is reversed in polarity relative to the primary winding 33 to reverse the polarity of the voltage so as to have the effect of a perfectly linear and very low loss inductance burden at a minimal expense. Note that very low loss inductance burdens are economically unobtainable at power frequencies.

Thus, the line drop compensator 13 scales down the potential to be measured by a selected factor, and combines the potential with voltages proportional to the input currents. The voltages proportional to input currents are also scaled down precisely by the same factor and combined with the potential to be measured as though the voltages were at the initial values. Also, the voltages proportional to the input currents are adjusted to be precisely in phase with an input current by above mentioned capacitors which compensate for the phase shift through the input current transformer. The resistors R4 and R8 adjust the magnitude of the voltages proportional to the input currents to the desired value so as to compensate for component tolerances.

The input to transformers T1 and T2 of the line drop compensator 13 is one phase of a transformer load current and the outputs are voltages proportional to the drop in the line. The outputs of transformers T1 and T2 are combined vectorially with the voltage from potential transformer T4 to obtain a result which simulates the voltage being provided to the user.

A transformer T3 having a primary winding 37 and a secondary winding 39 couples a circulating current to the circuit for purposes of paralleling transformers.

The capacitors C3 and C4 connected to the secondary winding 31 of transformer T3, provide a capacitive burden to obtain a voltage approximately 90° out of phase with the input circulating current. As in the case of transformer T2, secondary winding 39 is connected to reverse the polarity of the circulating current to obtain the effect of nearly perfect inductive burden.

The purpose of including transformer T3 in the circuit 11, and of the circulating current provided by transformer T3 is as follows. Load tap-changing transformers are commonly operated with both primary and secondary windings of two or more transformers connected in parallel. Slight differences of the voltage setting of the controls will have the effect of making one transformer raise its tap position and the other to lower its tap position in an attempt to satisfy each independent control. One method of overcoming this difficulty is to make one transformer control function as the master control, and all transformer controls function other slaves. The foregoing requires a complexity of control wires and has the disadvantage that not all controls may be alike.

An industry wide standard has been established to permit paralleling of transformers and one series current circuit is all that is required for proper paralleling. This latter method involves measuring the circulating reactive current that will flow between transformers which are not on the same tap position. A transformer whose tap is too high will have a leading component balanced by a lagging current from the parallel transformers whose tap is too low. The circulating current is fed serially to each controller, using an industry standard full scale value of 0.2 amps. And, this current will always be a nearly purely reactive current of one polarity or the other.

As mentioned above, the line drop compensator develops a voltage 90° out of phase with the circulating current, per the industry standard, so as to make this voltage in or out-of-phase with the voltage seen by the controller. The polarity is arranged such that the circulating current voltage will add in a controller whose switch is on a position which is too high. This will make the controller see a composite voltage which is of a higher magnitude; and, therefore lower its tap setting. Concurrently, the voltage will substract on transformers having too low a setting causing the associated controller to raise its tap position. When the transformers are on respective taps, which provide the same voltage, the circulating current goes to zero and this effect ceases.

The outputs of transformers T1, T2 and T3 are connected through respective resistors R10, R11 and R12 to a common point 40, and to the stationary contact of a switch S2 which has an operate contact 41 and a test contact 43.

It should be appreciated that capacitors are used in the reactance networks of transformers T2 and T3 rather than the more commonly used inductors since it has been found that capacitors provide nearly perfect linearity with variable current level, and at a lower cost than inductances. By using capacitors and changing the polarities of the secondary windings 35 and 39 of transformers T2 and T3, the phasing is changed to the correct point. Thus, the reversal of the polarity through T2 and T3 makes the capacitive burden appear to be an inductive burden, and the capacitors have the advantage of providing nearly perfect linearity at variable current levels.

The combined outputs from transformers T1, T2, T3 and T4 are coupled through lead 44 to the inverting terminal 2 of operational amplifier Q1 which is part of a voltage detection circuit 13A. A reference potential is coupled to the non-inverting terminal 3 of amplifier Q1. The operational amplifier Q1 is used as a combination summing amplifier and a temperature independent half wave rectifier, and function to sum the various voltages while virtually eliminating interaction between the voltages being measured and the control circuits, as will become more evident hereinbelow.

Amplifier Q1 includes a feedback circuit comprising diode D4, which is connected to the output terminal of amplifier Q1, thermistor Rt1, and series resistor R16 connected back to the inverting terminal 2 of amplifier Q1. Diode D4 is connected to have its cathode connected to the output terminal of amplifier Q1, and its anode connected to thermistor Rt1. A resistor R68 is connected in parallel with thermistor Rt1. The output of amplifier Q1 is coupled through diode D4 and series resistor R8 to a circuit which will be described hereinafter to provide a d-c voltage proportional to the a-c voltage inputs.

As is known, operational amplifier Q1 will effectively servo itself such that the sum of the input currents flow through feedback resistor R16. When the sum of the inputs is positive, the output of amplifier Q1 will be a negative voltage proportional to the sum of the voltage at the junction of diode D4 and resistor R18. When the sum of the inputs is negative, the feedback is blocked by diode D4 so that the summing input actually moves negative and amplifier Q1 switches positive to saturation. In addition to providing a summing function, the foregoing provides a half wave rectifier action while eliminating the effect and error of any voltage changes due to the temperature sensitivity of diode D4. The output of amplifier Q1 is coupled through diode D4 and resistor R18 to an RC network including resistor R17 and capacitors C6, C7 and C8, all of which are connected in common to the non-inverting terminal 3 of amplifier Q1.

Resistors R19, R20 and R67 are in series with resistor R18. The junction of resistors R18 and R19 connects to resistor R17 and capacitor C6; the junction of resistors R19 and R20 connects to capacitor C7, and the junction of resistors R20 and R67 connects to capacitor C8. A capacitor C17 and resistor R66 are connected in series with each other and in parallel with capacitor C7. A capacitor C18 has one terminal connected to the junction of capacitor C17 and resistor R66 and its other terminal connected to the output side of resistor R67.

Capacitors C7, C8, C17 and C18 and resistors R66 and R67 are part of a twin-T filter which is effective to remove the 60hz ripple component, and the low pass portion of the filter removes any higher frequencies. The twin-T filter improves the response time to change in the input voltage to approximately 0.1 second or less, which is substantially faster than the operation of the tap-changer mechanism and enables the regulator control circuit to determine whether the voltage is within the bandwidth during the periods between the tap-changes to thereby control the initiation of additional tap-change operations without hunting. Such hunting could be caused by the tap-changer initiating a step change even though the voltage is within the band limits. If this change took the voltage outside the band, a control oscillation would result even though no control action is needed. The fast response of the voltage detector 13A prevents this oscillation even when a bandwidth as narrow as one volt is used. Thus, the voltage detection circuit 13A provides a d-c voltage proportional to the root means square (rms) component of the voltage summed by operational amplifier Q1, and this d-c voltage is relatively independent of the wave distortion that may be caused by a distorted a-c current wave shape being coupled into the line drop compensator 13. Voltage detection circuit 13A uses an RC circuit comprising resistor R19 and capacitor C7 together with the twin-T filter which is resonant at the predominant power frequency to remove fundamental component of ripple from the d-c voltage while yet providing a fast response to the input a-c voltage which is essential in the prevention of hunting by the transformer tap-changing mechanism. As indicated above, resistors R17, R18 and capacitor C6 are chosen to make the d-c voltage proportional to the rms content of the input even though the input may be considerably distorted. Proper compensation is thus provided for non-linear loads such as arc furnaces which may severely distort the current wave shape and through this disturb the compensated voltage to be detected.

Figure 2:
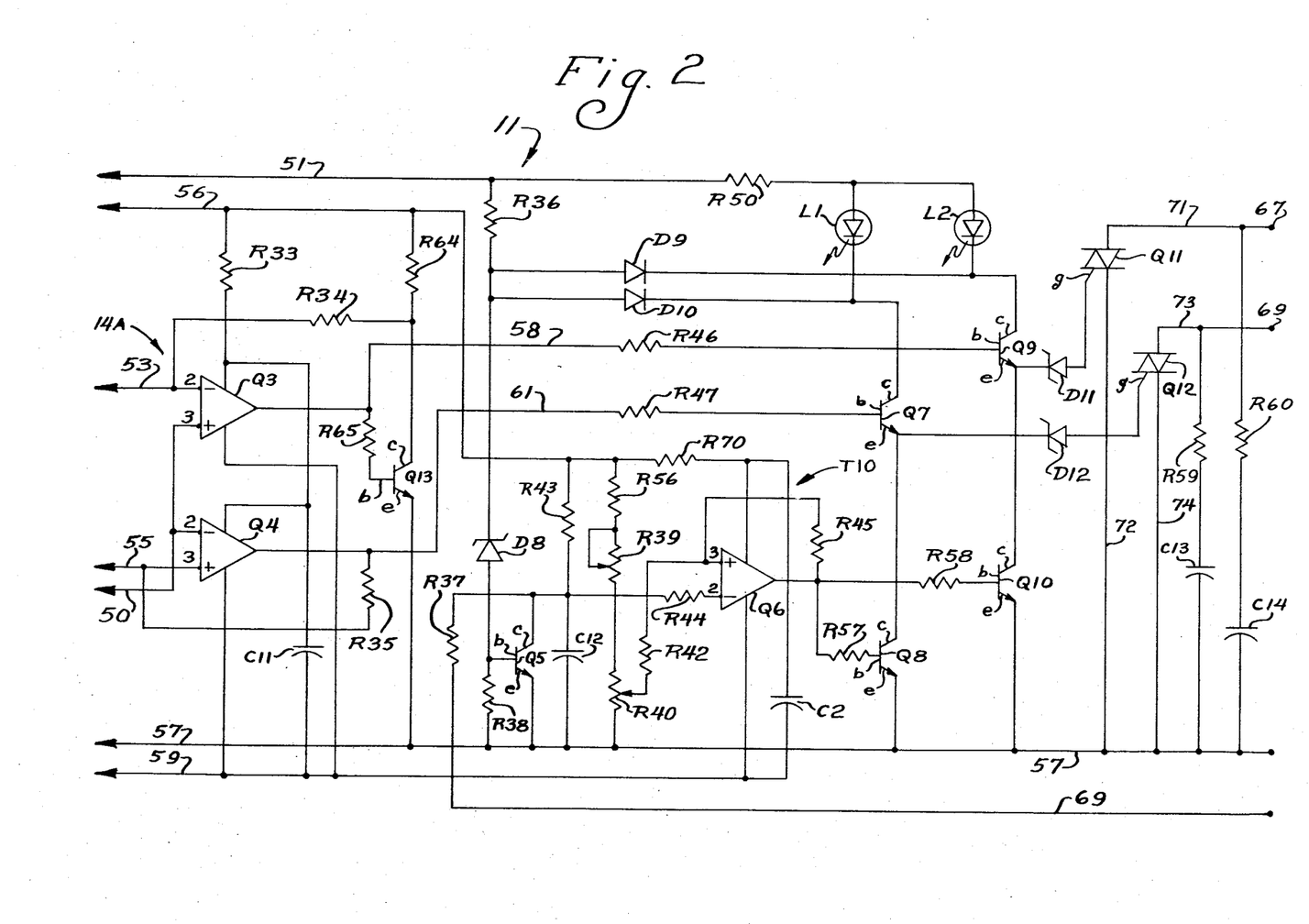

The output E (d-c voltage) from the voltage detection circuit 13A is coupled through lead 50 to the bandwidth detection circuit 14A, as shown in FIG. 2, and which will be described hereinafter.

The right hand side of FIG. 1 shows the voltage sensing portion 14 of the circuit 11. Transformer T5, which has a primary winding 47 connected across power lead 15 and ground, and a center tapped secondary winding 49, provides an unregulated supply voltage to circuit portion 14. The anodes of two diodes D5 and D6 are connected to opposite ends of secondary winding 49 and their cathodes are connected in common to a lead 51. The center tap of secondary winding 49 is connected to ground.

The lower terminal of secondary winding 49 is connected through diode D13 and capacitor C15 to ground. A resistor R55 and zener diode D14 and D15 are connected in parallel to capacitor C15. Diode 13 functions as a half wave rectifier, and the network including zener diodes D14, D15 and capacitor C15 provide a regulated negative voltage.

Lead 51 couples to a conventional integrated circuit (IC) voltage regulator Q2 which is effective to provide a very stable reference source for voltage determination and timing. An output of voltage regulator Q2 connects through series resistor R21 to lead 56. Resistors R22, R23 and R24 are connected in series with each other and across lead 56 and ground lead 57. Another output from regulator Q2 connects through to lead 53 to a variable tap on resistor R23. Operating components comprising resistor R69 and capacitors C10 and C21 are connected to regulator Q2.

A constant voltage network is connected across the resistors R22, R23 and R25 and includes resistor R25, variable resistor R31, zener diode D7 and variable resistor R26.

Another series resistor network is connected across zener diode D7 and includes resistor R27, variable resistor R28, resistor R29 and resistor R20. The junction of resistor R27 and R28 is connected through lead 53 to operational amplifier Q3, and the junction of resistor R29 and R30 is connected through lead 55 to operational amplifier Q4.

The zener diode D7 maintains a constant voltage across the bandwidth determining circuit so that the voltage bandwidth is independent of the voltage control resistors R26, and R31. The zener diode D7 and the fact that the resistances of resistors R27 and R30 are equal, assures that the bandwidth will vary about a center range determined by R26 and R31.

The bandwidth detection circuit thus includes zener diode D7 in a reference voltage circuit together with two resistors R27 and R30 of equal resistance connected at either end of the bandwidth control circuit. The foregoing is for the purpose of establishing two band limit reference voltages in such a way that the difference between the upper and lower reference voltage remains constant as the center of the band is varied by the voltage control potentiometer R29. The band limit references will thus move equally towards a center voltage reference point as the single bandwidth control potentiometer R29 is varied. The band limit reference voltages may be shorted by shorting across leads 53 and 55 to obtain a single reference voltage at the center of the bandwidth and is useful in precisely setting the voltage control. If an induction voltage regulator is being utilized, the foregoing short may be provided by a relay on the induction voltage regulator. The relay would pick up and provide a short whenever the motor runs to turn the regulator. This causes the regulator to always run to the center of the band and stop, thus providing the effect of minimizing the number of operations of the regulator and reducing wear.

An external resistor RX, indicated by the dotted lines, may be switched to connect to the reference potential to either of bandwidth reference leads 53 or 55 so as to lower the voltage set for brownout control. Resistor RX can be switched in and out such as by a radio link.

As indicated, leads numbered 51, 56 and 57 at the lower left hand of FIG. 1 are connected to the similar numbered leads on the right side of FIG. 1. Referring now to FIG. 2, leads 53 and 55 are respectively connected to conventional operational amplifiers Q3 and Q4, which function as threshold or bandwidth detectors. Lead 53 is connected to the inverting terminal 2 of amplifier Q3 and lead 55 is connected to the non-inverting terminal 3 of amplifier Q4. Terminal 3 of amplifier Q3 is also connected to terminal 2 of amplifier Q4 and the lead 50, which is the output lead, of the voltage detection circuit 13A of FIG. 1.

The outputs of operational amplifiers Q3 and Q4 switch as the E (d-c voltage) on lead 50, which is proportional to the compensated a-c input, goes outside the band of the reference voltage coupled across leads 53 and 55.

Thus, the bandwidth detection circuit 14A utilizes operational amplifier which function as the threshold detectors and switch the output with a few millivolts change in differential inputs and have drift and tolerances also measured in millivolts. Since the detected d-c voltage is in the order of 10 volts, the foregoing has the effect of swamping out the drift and tolerances of the operational amplifiers.

The voltage detection circuit 14A also includes positive feedback resistors R34 and R35 for the operational amplifiers so as to provide a small hysteresis or compounding of their operation. The foregoing prevents switching at the power frequency rate at the band edges due to residual a-c voltage components in the d-c voltage analog of the sensed input. Such rapid switching has an undesirable effect in causing the mechanical device driven by the triac output to chatter.

Operational amplifier Q3 has an output connected through lead 58 and resistor R46 to the base $b$ of an NPN transistor Q9. The output of operational amplifier Q3 is also connected through resistor R65 to the base $b$ of an NPN transistor Q13. The collector $c$ of transistor Q13 is connected through resistor R64 to lead 56, and its emitter $e$ is connected to ground lead 57. The collector $c$ of transistor Q13 is connected through resistor R34 back to the inverting terminal 2 of operational amplifier Q3.

The output of amplifier Q4 is connected through the lead 61 and resistor R47 to the base $b$ of NPN transistor Q7. A resistor R35 is connected from the output of amplifier Q4 back to the non-inverting terminal 3.

A resistor R33 connected in series with capacitor C11 across leads 56 and 59 provides a supply voltage to operational amplifiers Q3 and Q4.

A resistor R36 is connected in series with a zener diode D8 and a resistor R38 across leads 57 and 51. Diodes D9 and D10 are connected from the junction of resistor R36 and zener diode D8 to the collectors $c$ of transistors Q9 and Q7 respectively.

The timing circuit or timer T10 of the regulator control comprises operational amplifier Q6 and its associated input network including NPN transistor Q5. Transistor Q5 has its base $b$ connected to the junction of zener diode and resistor R38, its emitter $e$ connected to ground, and its collector $c$ connected to the junction of resistors R37 and R44. The other terminal of resistor R37 is connected to an external control for purposes to be discussed, and the other terminal of resistor R43 is connected to regulated voltage lead 56. The output of transistor Q5 is connected through resistor R44 to the inverting terminal 2 of operational amplifier Q6. A capacitor C12 is connected across the collector $c$ to emitter $e$ of transistor Q5. Resistor R43 is also connected to collector $c$ of transistor Q5.

A voltage divider circuit consisting of resistor R56, variable resistor R39 and potentiometer R40 is also connected across leads 56 and 57. The tap of potentiometer R40 is connected through series resistor R42 to the non-inverting terminal 3 of operational amplifier Q6. The operating potential for operational amplifier Q6 is coupled from the junction of a resistor R70 connected in series with capacitor C2 across leads 56 and 59. A feedback circuit for operational amplifier Q6 is provided by resistor R45.

The output of amplifier Q6 is connected through resistor R58 to the base $b$ of NPN transistor Q10, and also through a resistor R57 to the base $b$ of NPN transistor Q8. Transistor Q8 has its collector $c$ connected to the emitter $e$ of transistor Q7, and its emitter $e$ connected to ground lead 57. Transistor Q10 has its collector $c$ connected to the emitter $e$ of transistor Q9, and its emitter $e$ connected to ground lead 57.

The emitter $e$ of transistor Q7 is connected through zener diode D12 to the gate $g$ of triac Q12, and the emitter $e$ of transistor Q9 is connected through zener diode D11 to the gate $g$ of triac Q11.

One current electrode of Q11 is connected through output terminal 67 to the "raise" contact of a motor starter relay, not shown. The other current electrode of Q11 is connected to ground lead 57. Resistor R60 and capacitor C14 are connected across the current electrodes of triac Q11.

Likewise, one current electrode of triac Q12 is connected through output terminal 69 to the "lower" contact of the motor starter relay. The other current electrode of Q12 is connected to ground lead 57. Resistor R59 and capacitance C13 are connected across the current electrodes of triac Q12. The motor starter relay actuates the tap-changer mechanism.

A light emitting diode (LED) L1 is connected across lead 51 and collector $c$ of transistor Q7. A second LED L2 is connected across lead 51 and collector $c$ of transistor Q9. A resistor R50 is connected in common to the two anodes of LED's L1 and L2. LED's L1 and L2, when lit, indicate that the voltage is outside of the selected band and also indicate a forthcoming tap-changer operation as soon as the timer T10 times out.

A safety feature is provided by zener diode D11 and D12 which receive the output from bandwidth detector operational amplifier Q3 and Q4 respectively. Zener diodes D11 and D12 function to block the outputs of detectors Q3 and Q4 if the system input voltages are abnormally low, which can cause the system to be performing improperly.

Thus, the light emitting diodes and the associated driving transistors give an immediate visual indication of the switching of the bandwidth detectors Q3 and Q4.

Transistors Q7, Q8, Q9 and Q10 shunt the LED L1 and L2 current past the triac gates until the timer times out at which time the current from the active light emitting diode (LED) is permitted to couple to the associated triac gate thereby energizing any connected output device.

The series resistor R50 permits the LED current to decrease sufficiently upon completion of the timer operation so that the LED changes its brightness sufficiently to indicate visually the operation of the timer even if the output device driven by the triacs is disconnected, for example, with the transformer in the manual position. This permits testing of the controller even though it is not functionally connected to the tap-changing mechanism.

The timing circuit T10 provides a precise and stable timer which operates by charging capacitor C12 through R43 from a stable source to a point where the operational amplifier Q6 switches. An adjustable reference input to operational amplifier Q6 is provided through timing control resistor R40. Resistor R45 in the feedback circuit of amplifier Q6 provides a snap action when the threshold level is reached.

Resistors R39 and R40 provide adjustment such that the timer is adjustable from 0 to 120 seconds (in one embodiment) and the timer starts the time sequence when the voltage goes outside of the band and resets within a few milliseconds after the voltage level returns to band; or, when the timer is reset by an external contact. The timer T10, thus has two modes of operation, with a first mode being a non-sequential mode wherein the timer resets after a tap-change; regardless of voltage, and, the second mode is a sequential mode wherein the timer resets after the sensed voltage is back within the band. The mode of operation may be controlled through lead 69 from a point external to circuit 11.

The light emitting diodes L1 and L2 are lit to indicate a raise or lower operation respectively. Lights L1 and L2 are turned on by transistors Q7 and Q9 respectively, whenever threshold detectors Q3 and Q4 render Q7 and Q9 conducting. Until the timer times out, the diode circuits are shunted to zero by transistor Q8 and Q10. When the timer times out, the current from either Q7 or Q9 is passed to the gate of the associated triac Q11 or Q12 thereby turning that triac on and causing the motor starter relay to operate.

As mentioned, when transistor Q5 conducts the timing capacitor C12 is shorted to thus cut off triac Q11 or Q12 whenever the voltage is caused to go back within the selected band. This occurs within one-half wave cycle or less, thus assuring that the tap-changer will stop within the limits of the bandwidth being used. The timing capacitor C12 can also be discharged by closing a contact from across leads 57 and 69.

Thus, the sensing circuit 13 of FIG. 1 senses the scaled down voltage and if the voltage is outside a selected normal range, that is, if the voltage is too high or too low for a longer time than pre-set, time as determined by the timer circuit of FIG. 2, than the motor starter relay is actuated to cause the motor to drive the tap-changing mechanism.

The motor starter relay will close the drive motor circuit such that it drives the tap-changing mechanism in the direction required to bring the voltage into the established band pass.

To briefly summarize, the operation of the circuit of FIG. 2, the operational amplifiers Q3 and Q4 are connected respectively to leads 53 and 55 connected across the voltage variable resistors R28 and R29 are part of the voltage divider circuit including zener diode D7. The potential on leads 53 and 55 set the upper and lower levels at which amplifiers Q3 and Q4, and hence, establish the voltage bandwidth.

The d-c voltage proportional to the a-c input is coupled from the output of the twin-T filter through lead 50 to the other input terminals of operational amplifiers Q3 and Q4. When the d-c voltage is either above or below the bandwidth range, either amplifiers Q3 or Q4 will provide an output to cause the transistors Q7 or Q9 respectively, to become conductive.

In the timing circuit, capacitor C12 charges and discharges to provide an accurate timing interval. When operational amplifier Q6 fires, it provides an output to cause transistors Q8 and Q10 to become conductive. With transistors Q8 and Q10 conducting the transistors Q7 and Q9 will be shorted to ground. In one mode, operational amplifier Q6 conducts for a selected period of time and then will be cut off for a given period of time until capacitor C12 again charges to a point where amplifier Q6 is caused to conduct.

If there is an output from either amplifier, Q3 and Q4, indicating that the d-c level is outside of the selected bandwidth, and if operational amplifier Q6, and hence Q8 and Q10 are non-conducting, transistors Q7 and Q8 will couple through zener diodes D12 or Q11 respectively to energize the triacs Q12 or Q11 respectively. When one of triacs Q12 or Q11 conducts the starter relay is actuated to energize the motor to drive the tap-changer mechanism in the direction to bring the d-c voltage back within the bandwidth. Each time operational amplifier Q6 conducts, the triacs Q11 or Q12 are cut off, and the motor drive of the tap-changing mechanism is interrupted. The tap-changing mechanism is thus stopped when there is no output from amplifiers Q3 and Q4 indicating that the voltage is back within the selected bandwidth.

Figures 3, 4:
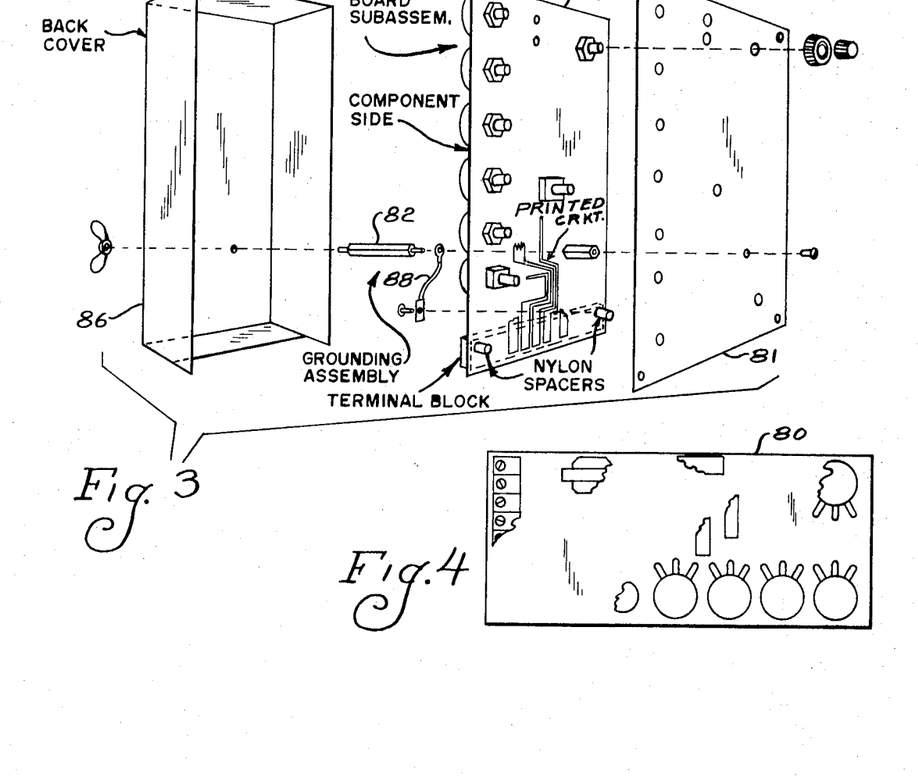
FIG. 3 shows an exploded view of the regulator control housing.
FIG. 4 shows a plan or front view of the printed board sub-assembly.

The housing H1 for the regulator control 10 is shown in FIG. 3.

A panel 81 for housing H1 is attached to the printed circuit board 80 without any sliding, moving, or pressure connections. It has been found that contacts may corrode and cause improper operation after extended service.

The printed circuit wiring 83 is arranged to minimize the length of the conductors and this minimizes undesired interaction between the circuits. Further, the printed circuit wiring is arranged to minimize the length of the conductors, 71, 72, 73 and 74 carrying the external current switched by the triacs; and, also those conductors common to the switching a-c power and the a-c input sensing circuit.

Also, the printed circuit is designed to minimize the length of the path from the summing point 40 to the input of operational amplifier Q1 and to shield this path by running regulated positive potential leads so as to largely surround the summing leads and overall summing circuit 13A. This prevents other a-c voltages from being coupled to the summing point and causing improper operation.

Note also that the back cover 86 is attached to the front panel 81 by the same bolt assembly 82 which is used to hold the back cover to thereby provide a terminal to which a single safety ground assembly 88, for both the cover and the panel may be electrically connected. Some of the components of the printed circuit board subassembly are indicated in FIG. 4.

It should be appreciated that the aforementioned apparatus may be utilized with three-phase load tap-changing (LTC) voltage changing transformers; single-phase LTC buck boost auto transformers; induction voltage regulators both single and three phase; and also with alternating current generators where the field is changed to change the voltage.

While the invention has been particularly shown and described with reference to a preferred embodiment thereof, it will be understood by those skilled in the art that various changes in form and details may be made therein without departing from the spirit and scope of the invention.

What is claimed is:

1. An alternating current voltage regulator control for sensing and monitoring voltage on an electrical distribution system comprising, in combination, means for coupling a first voltage to be sensed to the regulator control, current transformer means coupling input current, means for providing a second voltage in phase with the input current, second means for providing a third voltage shifted in phase relative to the input current, means for combining and summing the said voltages and providing a direct current voltage proportional to the sum thereof, means for determining a selected voltage bandwidth, and means for coupling said direct current voltage to said bandwidth determining means and providing an output indication when said direct current voltage is outside of said bandwidth.

2. A regulator control as in claim 1 further including a voltage bandwidth circuit including zener diode means, a voltage divider circuit connected across said zener diode for providing a voltage bandwidth independent of the voltage being controlled.

3. A regulator control as in claim 1 further including capacitive means for selectively changing the phase of the voltages.

4. A regulator control as in claim 1 further including an operational amplifier having an input circuit and a feedback circuit for combining said inputs, a diode connected in the output circuit and the feedback circuit of said amplifier, whereby said operational amplifier functions as a half wave rectifier and as a summing amplifier to provide an output which is a direct current voltage proportional to the inputs, and wherein the temperature sensitivity effects of said diode are minimized.

5. A regulator control as in claim 1 further including a timing circuit connected to provide an output indication when said direct current voltage is outside the bandwidth for longer then a selected period of time.

6. A regulator control as in claim 1 further including a pair of operational amplifiers receiving the output from said bandwidth control for providing an output when said bandwidths control indicates that the voltage being received is outside of said bandwidth.

7. A regulator control as in claim 6 wherein the bandwidth voltage is obtained from across said zener diode, and including variable resistors connected thereacross and effective to vary the bandwidth from maximum to zero.

8. A regulator control as in claim 1 for driving a tap-changer mechanism and including triac switches energizable by said regulator control.

9. A regulator control as in claim 8 further including light emitting diodes for indicating the occurrence of a tap-changer mechanism operation.

10. A regulator control as in claim 1 wherein the timer circuit includes an operational amplifier, a resistor network and capacitor means arranged to be charged and discharged to provide a precise time period, and wherein the timer may be operated in a sequential and a non-sequential mode.

11. A regulator control as in claim 1 further including means for scaling down the voltage to be sensed, means for scaling down the voltages proportional to the input currents whereby the voltage to be sensed and the voltages proportional to the input currents may be combined as though they were at their initial values.

12. A regulator control as in claim 1 further including current transformer means for obtaining an input current, means for obtaining a scaled down voltage in phase with the input current, capacitive means for compensating for the phase shift through the transformer and means for adjusting for component tolerances.

13. A regulator control as in claim 1 further including capacitive means for obtaining a voltage 90° leading the input current and adjustable resistor means for adjusting the angle and the magnitude of the voltage.

14. A regulator control as in claim 13 wherein capacitor means provide a scaled down voltage precisely 90° leading the input current, transformer means having the secondary reversed in polarity relative to the primary to provide the effect of a linear and low loss inductive burden.

15. A regulator control as in claim 1 further including a capacitive burden to obtain a voltage 90° out of phase with the input circulating current for transformer paralleling and means for reversing the polarity of the voltage to obtain the effect of an inductive burden.

16. A regulator control as in claim 1 further including an operational amplifier utilized as a summing means to sum the various voltages thereby performing the line drop compensation and minimize interaction between the voltages and their control circuits.

17. A circuit as in claim 16 wherein said operational amplifier is utilized as a summing amplifier and as a temperature independent half wave rectifier.

18. A circuit as in claim 17 further including a resistor capacitor network to provide a direct current voltage proportional to the root mean square component formed by the operational amplifier to provide a voltage which is substantially independent of the current wave distortion normally encountered.

19. A circuit as in claim 18 further including a resistor capacitor circuit, a twin-T filter resonant at the power frequency for removing ripple components from the d-c voltage while yet providing a fast response to the variations in the input a-c voltage.

20. A circuit as in claim 18 further including a bandwidth circuit having operational amplifiers coupled to receive said d-c voltage and respective reference voltages to provide outputs in response to a few millivolts change in their differential inputs while detecting a d-c voltage at the order of volts and thereby swamping out drift and manufacturing tolerances of the operational amplifiers.

21. A circuit as in claim 20 further including respective positive feedback for said operational amplifiers to provide a small hysteresis to eliminate switching at the band edges due to residual a-c component in the d-c voltage.

22. A circuit as in claim 20 further including zener diodes connected to receive the outputs from said operational amplifiers to block their output when the input voltages are abnormally low and the system is performing improperly due to insufficient voltage.

23. A circuit as in claim 21 further including light emitting diodes to give an immediate visual indication of the band edge operational amplifier detectors.

24. A circuit as in claim 2 further including a zener diode and two equal dropping resistors at either end of the band width control circuit to establish upper and lower band limit reference voltages such that the difference on the voltages will remain constant as the center of the band is varied.

25. A circuit as in claim 24 further including a single control potentiometer for varying the band limit references and causing them to move equally towards a center voltage.

26. A circuit as in claim 25 further including means for shorting the band limit reference voltages and obtaining a single reference voltage at the center of the band.

27. A circuit as in claim 26 wherein the short is provided by a relay of an induction voltage regulator whereby when the relay picks up and the motor runs to turn the regulator, the regulator runs toward the center of the band and stops.

28. A circuit as in claim 26 wherein means are provided for connecting an external resistor to the circuit for lowering the voltage set point.

29. A regulator control as in claim 1 including a tap on the input transformer, a variable series test resistor to provide an effective increase or decrease in the input voltage thereby permitting the normal input potential to be used to check either upper or lower band limits.

30. A regulator control as in claim 29 wherein the larger diameter wire is used in a portion of the input transformer from the normal input tap to the test tap so as to form an auto transformer and permit the use of a voltmeter of any impedance to measure the transformer input voltage.

31. A regulator control as in claim 30 further including means for connecting to the transformer at an intermediate tap to obtain a percentage of the input voltage whereby the voltage may be raised or lowered for connecting to a test circuit to enable the checking of the voltage setting independent of the transformer load or circulating current.

32. A regulator control as in claim 1 wherein the circuitry of said control is formed on a singe printed circuit board assembly to permit easy removal of the associated panel to thereby expose all the circuitry for repair or for work thereon.

33. A printed circuit board as in claim 32 wherein the printed circuit is designed to minimize the length of the conductors carrying the external current to minimize interaction between the external current and the sensing circuits.

34. A printed circuit as in claim 33 designed to minimize the conductor path length to the voltage summing point, and regulated voltage conductors straddling the conductor carrying the combined voltage to thereby prevent other a-c voltages from being coupled to the summing point.

35. An apparatus as in claim 32 including a back cover and a panel connected between the same means to thereby provide a terminal point for electrically connecting a single safety ground connection thereto.

* * * * *